United States Patent [19]
Onishi et al.

[11] 3,831,267
[45] Aug. 27, 1974

[54] METHOD OF MANUFACTURING A SLEEVE ARMATURE

[75] Inventors: Kazuo Onishi; Seizi Yamashita; Mikio Sato, all of Hitachi, Japan

[73] Assignee: Hitachi, Ltd., Tokyo, Japan

[22] Filed: Mar. 9, 1973

[21] Appl. No.: 339,918

[30] Foreign Application Priority Data
Mar. 10, 1972   Japan............................. 47-24020

[52] U.S. Cl...................... 29/598, 29/605, 310/43, 310/266
[51] Int. Cl. ........................................ H02k 15/02
[58] Field of Search...... 29/596, 598, 605; 310/266, 310/261, 264, 43

[56] References Cited
UNITED STATES PATENTS

| | | | |
|---|---|---|---|
| 2,759,116 | 8/1956 | Glass............................ | 29/598 UX |
| 3,436,815 | 4/1969 | Sheets................................. | 29/605 |
| 3,650,021 | 3/1972 | Karol................................ | 29/598 |
| 3,694,907 | 10/1972 | Margrain et al..................... | 29/598 |

*Primary Examiner*—Charles W. Lanham
*Assistant Examiner*—Carl E. Hall
*Attorney, Agent, or Firm*—Craig & Antonelli

[57] ABSTRACT

A sleeve armature and a method of manufacturing the same in which a number of component coils composing the winding are uniformly mounted flatly and in a partly superimposed manner on the circumference of an inner mold, and after the coils are impregnated with a thermosetting resin, the coils mounted on the inner mold are enclosed with a thermocontracting coating, and then the structure is heated. The thermocontracting coating contracts and applies a uniform pressing force to the coils and the thermosetting resin, and at the same time the thermosetting resin is set.

4 Claims, 10 Drawing Figures

METHOD OF MANUFACTURING A SLEEVE ARMATURE

FIELD OF THE INVENTION

The present invention relates to a winding of a sleeve armature molded with thermosetting resin and a manufacturing method thereof.

DESCRIPTION OF THE PRIOR ART

A sleeve armature motor has been used as a capstan motor for a tape dicky in an electronic computer because of its advantage that the starting and stopping time of the rotor of a sleeve armature motor is shorter than that of an iron core armature motor. With the improvement in the operation speed of the electronic computer the tape speed is also improved. Consequently, also the sleeve armature motor as the capstan motor becomes to be required to be a one of a higher speed and a shorter starting and stopping time.

For a motor for tape speeds of 25 in/sec., 37.5 in/sec., and 75 in/sec., the rotor is thick and can be manufactured by appropriately providing a winding thereto. However, at a tape speed of from 150 in/sec. to 200 in/sec., a motor must be of a high speed operation with short starting and stopping time. A motor cannot be used under such a condition unless the moment of inertia of its rotor is extremely small and the density of magnetic flux at the air gap between its rotor and stator is high. For such a motor the rotor must be thin and the space factor of the winding must be high. Consequently, the winding must be regularly arranged in one layer with precision.

Figure 2:
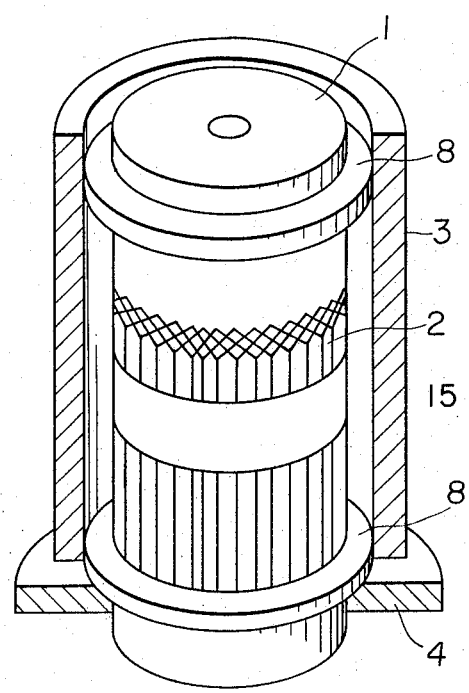
FIG. 2 is a partly sectional oblique view of a mold for explaining an improved prior art method.
Figure 7:
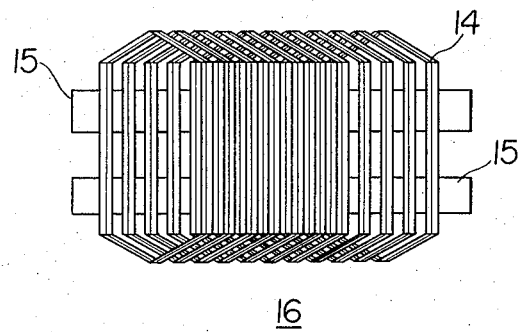
FIG. 7 is plan view of a group of coils pressedly placed in a row on a plain.

In the past, this kind of winding was manufactured by manually lining up individually premanufactured coils on a mold. Consequently, this manufacturing method is a very time consuming and troublesome one. More particularly, according to a prior art method of manufacturing a winding, a lead wire is wound on a former as shown in FIG. 2 at a turn number specified by a winding specification, the wound wire is temporarily fitted by, for example, a string, adhesive tape, or the like so that individual turns are not separated randomly into a coil element, and the same number of coil elements as the number of poles of a commutator are arranged on a rod shape inner mold. In these operations two lead wires must be made not to overlap each other as shown in FIG. 7 at the straight line portion of the rotor central lead wire. However, since the circumferential space factor of the winding is high, that 15, 90 percent or more, the turns are apt to superimposed on each other.

Consequently, coil elements must be lined up on the mold in such a manner that the turns of the lead wire do not overlap each other and in the winding order of the winding. Since these operations must be carried out manually, not only the operations are troublesome and time-consuming, but also the characteristics of the winding are not satisfactory due to the fact that the coils are unevenly wound or the alignment thereof is irregular, and the coil wire is twisted.

A winding for a sleeve armature as above described is molded with a thermosetting resin. At this time the winding is arranged on the circumference of an inner metallic mold and bound tight with a binding wire, string, glass fiber or the like. An outer mold therefor is either a mold whose inner part contacting with the winding is formed of a relatively soft and easily releasable material such as Teflon (Trade Mark) or a metallic split mold. The former is usable when the outer diameter or dimension of the winding is not so critical, while the latter is usable when the outer diameter is critical.

Consequently, for the manufacture of the armature winding of a motor whose air gap is very small a metallic mold has generally been employed as an outer mold. However, when setting the metallic split mold, the winding is often jammed in the mold or damaged so that many defective windings are produced.

Consequently, a molding method which does not damage the winding and which provides an accurate outer dimension of the winding is earnestly desired.

Figure 1:
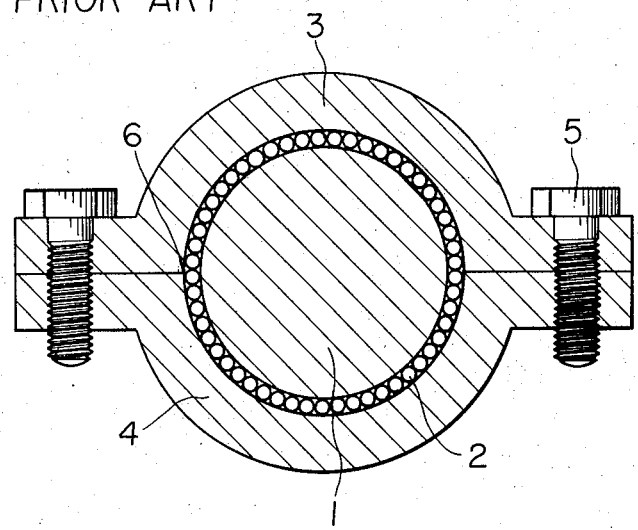
FIG. 1 is a cross-sectional view of a mold employed in a prior art molding method.

A prior art method will first be more practically described with reference to FIG. 1. On the circumference of an inner mold 1 is arranged a winding 2 (this winding may be a one which has been formed beforehand) the outer side of which is bound fixed with a string or tape. On the thus mounted winding 2 is further mounted a metallic outer mold 3 and 4 which is fixed tight by bolts 5 or the like. Then the winding 2 is impregnated with a resin and heated to set the resin, after which the outer mold 3 and 4 and the inner mold 1 are detached from the winding 2 to leave the hollow winding 2.

However, in such a prior art method a part of the winding 2 is often jammed in the adjoining portion 6 of the outer mold member 3 and 4 or crushed when the outer mold member is mounted on the winding to cause a trouble of short-circuiting. Thus, the mounting of the outer mold member 3 and 4 must be made very carefully, and hence the working efficiency is very low.

In order for the winding 2 not to be jammed in the adjoining portion 6 of the outer mold member 3 and 4, the binding of the winding 2 by the string or the like wound around the winding 2 must be unnecessarily firm and must be uniform over the entire circumference of the winding 2. Consequently, the binding operation is also very troublesome.

To prevent such biting of the winding by the outer mold member, a method has been proposed in which spacer rings 8 are interposed between the winding 2 mounted on the circumference of the inner mold member 1 and the outer mold member 3 and 4 as shown in FIG. 2. According to this method, the damage of the winding by the outer mold member can be prevented, but it has the vital disadvantage that the space factor of the motor is reduced because a resin layer is formed to the thickness of the spacer ring 8.

SUMMARY OF THE INVENTION

An object of the present invention is to provide a method of manufacturing a sleeve armature having well-balanced coils and an excellent characteristic in a short time and yet simply and easily.

Another object of the present invention is to provide a sleeve armature winding of a small outer diameter and thickness and molded with a thermosetting resin, in which the reduction of the space factor is prevented.

A further object of the present invention is to provide a method of forming a winding in which the damage of a winding by a split mold at the time of molding the winding is totally prevented and the working efficiency is high.

The feature of the present invention is that a number of coils composing a winding formed at constant intervals and fixed are mounted on the circumference of an inner mold member flatly and in a partly superimposed manner by obliquely pressing the coils against the surface. The coils mounted on the inner mold member are impregnated with a thermosetting resin and then covered with a thermocontracting coating. The structure is then heated to allow the thermocontracting coating, which functions as an outer mold member, to contract to apply a uniform pressing force to the coils and the thermosetting resin and at the same time to set the thermosetting resin.

According to the present invention, by employing the thermocontracting coating which acts as an outer mold member, the dimension of the winding can be made accurate, the reduction of the space factor by the molding resin is prevented, and the damage of the winding is totally avoided.

DESCRIPTION OF THE PREFERRED EMBODIMENT

Figure 3:
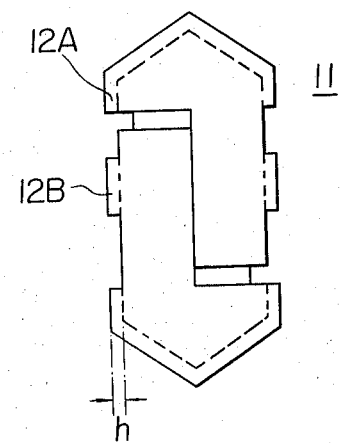
FIG. 3 is an elevational view of a bobbin or former employed in the present invention.
Figure 4:
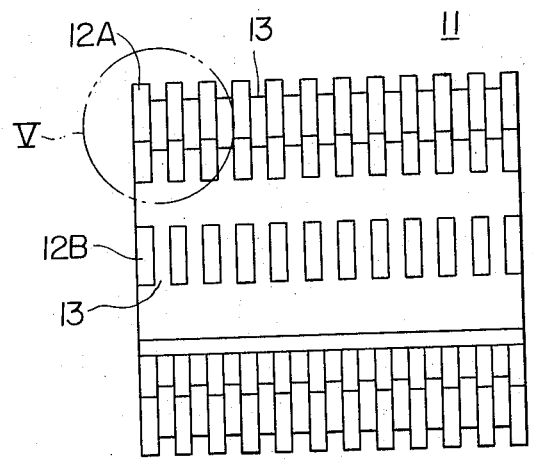
FIG. 4 is a side view of the former of FIG. 3.
Figure 5:
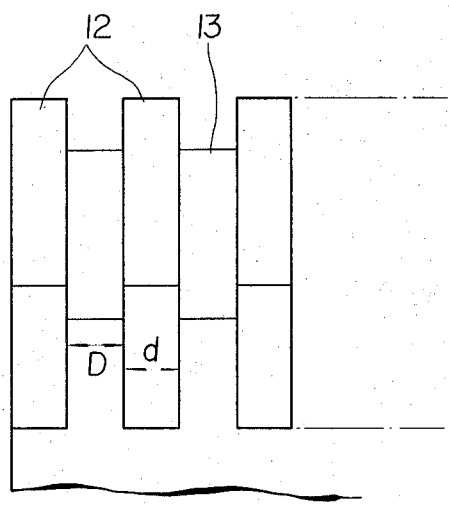
FIG. 5 is an enlarged view of the part indicated by reference character B of the former of FIG. 4.

Reffering to FIGS. 3 to 5, a tortoise shell or diamond shaped bobbin or former 11 is provided with a plurality of guides 12A and 12B so that the entire winding of at least one armature can be wound around the former 11 at a time. The former 11 is supported by bolts or the like (not shown) retractably in the vertical direction in the drawing. Each slit 13 between the guides 12 of the former 11 is formed so that one coil element 14 is formed therein, and hence the width D of each slit 13 is substantially equal to the width of each coil element. The width d of each guide 12 is made substantially equal to the width D of each slit 13 so that, in the state of coil elements 14 wound around the former 11, the spacing between the coil elements is equal to the width of each coil element.

Consequently, if adhesive tapes 15 are attached to the coil elements 14 wound around the former 11 at positions where the guides are not present or, in other words, at positions offset from the guides 12, the coil elements 14 adhere to the adhesive tapes 15 regularly at equal intervals.

Figure 6:
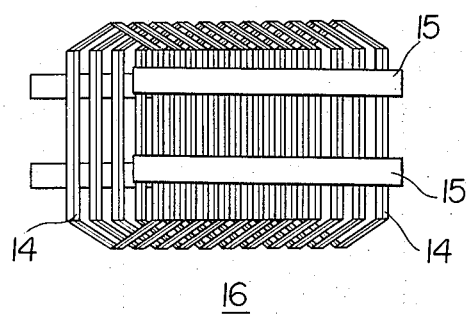
FIG. 6 is a perspective view of a group of coils removed from a former.

Then, the coils 14, which are in the state of adhering to the adhesive tapes 15, are taken off from the former 11. The detachment of the coils 14 from the former 11 is easily made by loosening the not shown clamping members such as clamping bolts because the former 11 then retracts in the vertical direction in the drawing. The group 16 of coils 14 taken off from the former 11 is shown in FIG. 6. Then, the group of coils 16 is obliquely pressed against a plane, while keeping the adhesive tapes 15 on the plane side adhered to the coils 14, so that the side of each coil 14 on the plane side lies in the loop of another coil as shown in FIG. 7. At this time, since the spacing d between the coils 14 is equal to the width D of each coil 14, one side of any coil lies in the interspace between the opposite sides of other adjacent two coils, thus sides of the coils lying with a uniform density on the plane to form one winding 2 accurately.

The former 11 shown in FIG. 3 has portions provided with no guide at which the adhesive tapes 15 are applied to the coils 14, that is, the guides 12 consist of discrete portions 12A and 12B. However, if the height h (FIG. 3) of the guides 12 is made slightly smaller than the thickness of the coils 14, the guides 12 can be continuous ones provided all around the former 11 without preventing the attachment of the adhesive taps to the coils at any positions.

Figure 8:
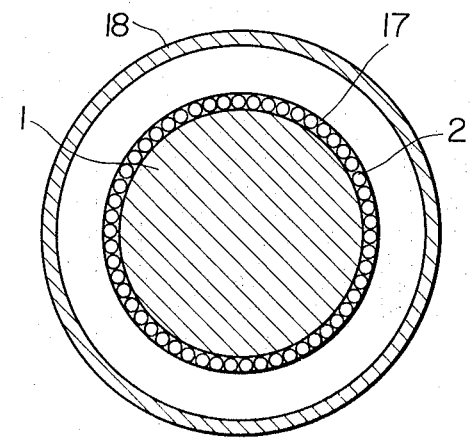
FIG. 8 is a cross-sectional view of coils mounted on an inner mold and surrounded with a thermo-contracting coating before heating.
Figure 9:
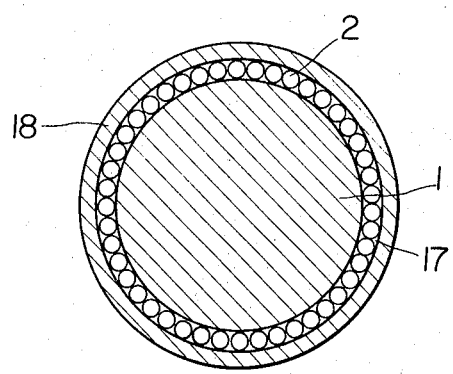
FIG. 9 is a cross-sectional view of the structure after heating.

The thus formed winding 2 is mounted on the inner mold member 1 as shown in FIG. 8, and then the adhesive tapes 15 are removed or peeled off from the winding 2 after the winding 2 is temporarily bound by a string or the like at a position where no adhesive tape is present. Then, the winding 2 is impregnated with an amount of thermosetting resin 17, after which the inner mold member 1 and the winding 2 are covered with an amount of thermocontracting material 18. When this structure is heated, the coating 18 contracts to exert a uniform pressing force on the winding 2 from the circumference of the winding 2 as shown in FIG. 9. Consequently, an excess thermosetting resin 17 attached to the winding 2 is pressed out of the winding 2 by the compressing force of the coating 18, which functions as an outer mold member, to leave a necessary amount of thermosetting resin 17 for fixing the winding 2.

If necessary, the winding 2 may be bound tight with a glass string from the circumference of the winding 2.

Figure 10:
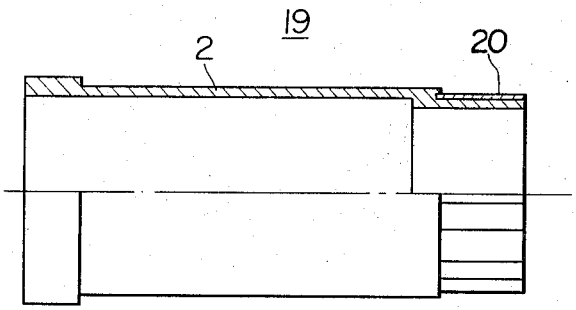
FIG. 10 is a partly sectional elevational view of a sleeve armature molded according to the present invention.

Next, the coating 18 is broken to be removed and the resin 17 and the winding 2 are cooled, and then the inner mold member 1 is withdrawn from the winding 2 to leave a hollow sleeve armature 19 as shown in FIG. 10 in which reference numeral 20 designates a commutator.

The material of the coating 18 may be any thermocontracting material, for example silicone resin.

Since the contraction coefficient of the coating 18 is generally of the order of 50 percent, it is preferable that the inner diameter of the coating 18 before the contraction by heating is from the outer diameter of the winding 2 after fixing to two times the outer diameter of the winding 2.

It is also possible that the winding 2 mounted on the inner mold member 1 is first coated with the coating 18 before it is impregnated with the thermosetting resin 17, and after heating the structure to press the winding 2 tight against the inner mold member 1 by uniformly applying a pressure to the winding 2 from the circumference thereof by the contraction of the coating 18, the winding 2 is impregnated with the thermosetting resin 17 and heated to set the resin 17.

We claim:

1. A method of manufacturing a sleeve armature comprising the steps of withdrawing a former from a series of coils wound on the former in a predetermined form, pressing the series of coils against a plane in a row so that the effective straight line portions of lead wires constituting the coils close sufficiently without overlapping each other, mounting the pressed series of coils on the circumference of an inner mold member, impregnating the series of coils mounted on the inner mold member with a thermosetting resin, surrounding the series of coils mounted on the inner mold member with a thermocontracting coating having an inner diameter larger than the outer diameter of the coils, heating the series of coils to set the thermosetting resin and at the same time heating the thermocontracting coating to cause contraction thereof so that a uniform pressing force is applied to the coils and thermosetting resin from the circumference thereof, and withdrawing the thermocontracting coating from the coils after the thermosetting resin impregnated into the coils has been set.

2. A method according to claim 1, wherein the step of mounting the pressed series of coils include securing the coils at a small portion of the straight line portion thereof about the circumference of the inner mold member.

3. A method according to claim 1, further comprising forming the coils and the thermosetting resin in a substantially very thin layer as a sleeve armature winding.

4. A method according to claim 1, further comprising providing a tubular sleeve armature winding of uniform thickness about the circumference thereof of approximately the thickness of a lead wire of the coils.

* * * * *